United States Patent
Park et al.

(10) Patent No.: US 12,266,833 B2
(45) Date of Patent: Apr. 1, 2025

(54) MEMBRANE-ELECTRODE ASSEMBLY AND METHOD FOR MANUFACTURING THE SAME

(71) Applicants: HYUNDAI MOTOR COMPANY, Seoul (KR); KIA CORPORATION, Seoul (KR)

(72) Inventors: Young June Park, Gyeonggi-do (KR); Han Hyung Lee, Goyang-si (KR); Soon Ho Jung, Yongin-si (KR); Seung Ah Yu, Yongin-si (KR); Min Jin Kim, Seoul (KR); Sun Il Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 736 days.

(21) Appl. No.: 17/459,634

(22) Filed: Aug. 27, 2021

(65) Prior Publication Data
US 2022/0115683 A1 Apr. 14, 2022

(30) Foreign Application Priority Data
Oct. 12, 2020 (KR) .......................... 10-2020-0131489

(51) Int. Cl.
*H01M 8/1004* (2016.01)
*H01M 4/88* (2006.01)

(52) U.S. Cl.
CPC .......... *H01M 8/1004* (2013.01); *H01M 4/88* (2013.01)

(58) Field of Classification Search
CPC .................................................. H01M 8/1004
See application file for complete search history.

(56) References Cited

U.S. PATENT DOCUMENTS 8,197,989 B2 * 6/2012 Jacobine ............. H01M 8/0276
429/510

FOREIGN PATENT DOCUMENTS

| JP | 2017-532730 A | 11/2017 |
| KR | 10-1378772 B | 3/2014 |
| KR | 10-1536062 B | 7/2015 |
| KR | 10-1664740 B | 10/2016 |

OTHER PUBLICATIONS

Cho, Hyesung et al., "*Multiplex lithography for multilevel multiscale architectures and its application to polymer electrolyte membrane fuel cell*" Nature Communications, 6:8484-DOI:10.1038/ncomms9484, www.nature.com/naturecommunications, published Sep. 28, 2015 pp. 1-8.

* cited by examiner

*Primary Examiner* — Sarah A. Slifka
(74) *Attorney, Agent, or Firm* — Morgan, Lewis & Bockius LLP

(57) ABSTRACT

A membrane-electrode assembly and a method for manufacturing the same are provided. The membrane-electrode assembly includes a pattern layer formed between a separator and a subgasket through a UV curing process.

8 Claims, 11 Drawing Sheets

MEMBRANE-ELECTRODE ASSEMBLY AND METHOD FOR MANUFACTURING THE SAME

CROSS-REFERENCE TO RELATED APPLICATION

The present application claims the priority to and the benefit of Korean Patent Application No. 10-2020-0131489 filed on Oct. 12, 2020, the entire contents of which are incorporated herein by reference.

TECHNICAL FIELD

The present disclosure relates to a membrane-electrode assembly and a method for manufacturing the same. More particularly, it relates to a membrane-electrode assembly including a pattern layer formed between a separator and a subgasket through a UV curing process, a method for manufacturing the same.

BACKGROUND

A fuel cell stack is manufactured by repeatedly stacking hundreds of unit cells and, in each unit cell, gaskets or subgaskets formed of a material, such as rubber, are used in order to ensure airtightness with respect to reaction gas and cooling water. Further, because hundreds of unit cells are combined with a designated compressive load, if durability of rubber gaskets is ensured for 10 years, the gaskets are in the compressed state by a designated amount for 80,000 hours or longer. The fuel cell stack is operated under various temperature, pressure and relative humidity conditions, and it is important that the fuel cell stack maintains airtightness throughout the period of use.

For this purpose, the gaskets or the subgaskets should maintain high elasticity for a long period of time, and exhibit high resistance to compressive strain. In general, a fluorine-based elastomer, a silicon-based elastomer, a hydrocarbon-based elastomer, etc. are widely used as the gaskets.

Recently, attempts have been made to perform a process for forming embossed and/or engraved patterns on a subgasket to realize airtightness.

If embossed and/or engraved patterns are formed on the subgasket, when the subgasket is bonded to a separator, line pressure is formed due to bonding between a surface and a line rather than surface pressure formed due to bonding between two surfaces under the same load and thus a higher pressure is formed, thereby being capable of increasing airtightness. That is, the same pressure is applied to a narrower area and thus the airtightness between the subgasket and the separator may be increased.

A film having the above-described patterns formed thereon may be manufactured through thermocompression using a heating roll, be manufactured by bonding a release paper having the patterns formed thereon to a base film, or be manufactured by placing a material on a roll.

The above information disclosed in this Background section is only for enhancement of understanding of the background of the disclosure and therefore it may contain information that does not form the prior art that is already known in this country to a person of ordinary skill in the art.

SUMMARY

Conventional processes for manufacturing the film having the patterns formed thereon have the following inconveniences.

First, in the process for manufacturing the film having the patterns formed thereon through thermocompression using a heating roll, in which the patterns are formed by melting a portion of a soft film by performing thermocompression on the soft film using the heating roll, it is difficult to selectively melt only desired positions of the soft film by performing thermocompression on the soft film and thus accuracy of formation of the patterns may be low, the soft film may be totally melted or portions of thereof may not be melted, and the patterns may disappear due to the restoring force of a film material after thermocompression. Further, selection of patterns having a desired height and shape is limited due to a requirement to abide by a fundamental ratio formula governing the shape and height of the heating roll and, because a new roll should be manufactured when the shape and thickness of the patterns are changed, processing time or manufacturing costs may be excessively increased.

Second, in the process for manufacturing the film having the patterns formed thereon by bonding a release paper having the patterns formed thereon to a base film, the patterns are transferred (decaled) to the base film from the release paper. However, in order to form the patterns on the film by bonding the release paper having the patterns formed thereon to the base film, a material in a liquid state should be used. That is, pressure is applied to the film at a high temperature close to the melting point of the film and, in this case, the release paper should have heat resistance sufficient to withstand this temperature. A release paper having high heat resistance is very expensive and is only usable once, which increases the production cost of the subgasket. Further, such a two-step process, i.e., formation of the patterns on the release paper and transfer of the patterns to the base film from the release paper, is inefficient in terms of processing time and cost.

Third, in the process for manufacturing the film having the patterns formed thereon by placing a material on a roll, the patterns are formed by depositing the material on the film using an ink-jet or 3D printing process. However, the patterns are formed to have a size of dozens of micrometers, and thus, mass-producibility is greatly lowered due to a low processing speed. Further, the material upon ejection through a nozzle should retain proper viscosity and flowability in order to form the patterns, and the material requires rapid curing at room temperature because the material should maintain the shape thereof immediately after application thereof. That is, the material necessarily requires high-temperature and high-pressure injection prior to application thereof, and thus, processing cost and the level of processing difficulty are excessively high.

Further, materials for the soft film having the above patterns formed thereon should satisfy all of the following requirements, but materials which may satisfy these requirements are extremely limited.

① Materials which may withstand repeated exposure to an extremely low temperature and a high temperature, exposure to a high-humidity environment and exposure to an acidic atmosphere
② Materials having high compressive strain resistance
③ Materials having high acid resistance and high chemical resistance
④ Materials having high water resistance
⑤ Materials having no additives having impurities including metal ions
⑥ Materials which may be interfacially bonded to PET, PCT and PEN films and may be coated to a thickness of several micrometers The present disclosure provides a method for implementing a pattern shape on a contact surface between a separator and a subgasket so as to ensure airtightness.

It is another aspect of the present disclosure to provide a pattern-shaped film which may have high ductility and high reaction force to compression and be inserted between a separator and a subgasket.

It is still another aspect of the present disclosure to provide a method for using a material which is conventionally difficult to insert into a membrane-electrode assembly and to form a pattern thereon.

It is yet another aspect of the present disclosure to provide a method for inserting a soft film having a pattern formed thereon between a subgasket and a separator at a high processing speed.

It is still yet another aspect of the present disclosure to provide a method for forming a pattern on a soft film applied to a membrane-electrode assembly without contraction.

It is a further aspect of the present disclosure to provide a soft film having a pattern formed thereon, which is applicable to extreme environments.

In one aspect, the present disclosure provides a membrane-electrode assembly including an electrolyte membrane including catalyst layers formed on both surfaces thereof, subgaskets provided on the respective surfaces of the electrolyte membrane, separators located on the subgaskets, and pattern layers interposed between the subgaskets and the separators.

In one form of the present disclosure, the pattern layers may include one or more pattern members having a shape of one of a polygon and a circle.

In some forms of the present disclosure, the subgaskets may include one of polyethylene terephthalate (PET), polyethylene naphthalate (PEN), polycyclohexylene dimethylene terephthalate (PCT), and polyimide (PI).

In some forms of the present disclosure, the pattern layers may include a curable material including urethane acrylate.

In some forms of the present disclosure, the pattern layers may further include a base material which is one of low-density polyethylene (LDPE), linear low-density polyethylene (LLDPE), thermoplastic polyurethane (TPU), cast polypropylene (CPP), and polyvinylidene fluoride (PVDF).

In some forms of the present disclosure, the pattern layers may include 1,800 to 3,300 parts by weight of the base material based on 100 parts by weight of the curable material.

In some forms of the present disclosure, the pattern layers may include pattern openings having a shape of one of a polygon and a circle.

In some forms of the present disclosure, the pattern layers may include a degradable material including a phenol formaldehyde resin.

In some forms of the present disclosure, the pattern layers may have a thickness of 500 nm to 50 μm.

In another aspect, the present disclosure provides a method for manufacturing a membrane-electrode assembly, the method including forming a pattern layer on each of base substrates, which is one of subgaskets and separators, performing primary bonding such that the subgaskets are bonded to both surfaces of the electrolyte membrane, and performing secondary bonding such that the separators are stacked on the subgaskets.

In some forms of the present disclosure, the forming of the pattern layer may include preparing the base substrate, applying a UV curable resin composition to the base substrate, preparing a mask sheet including openings on the base substrate having the UV curable resin composition applied thereto, curing portions of the UV curable resin composition by radiating UV light to the mask sheet, and removing remaining portions of the UV curable resin composition which are not cured.

In some forms of the present disclosure, the forming of the pattern layer may be performed in a roll-to-roll manner.

In some forms of the present disclosure, the UV curable resin composition may include a curable material including urethane acrylate, and an initiator.

In some forms of the present disclosure, the UV curable resin composition may further include a base material, and the base material may include one of low-density polyethylene (LDPE), linear low-density polyethylene (LLDPE), thermoplastic polyurethane (TPU), cast polypropylene (CPP), and polyvinylidene fluoride (PVDF).

In some forms of the present disclosure, the openings in the mask sheet may have a shape of one of a polygon and a circle.

In some forms of the present disclosure, the mask sheet may include at least two openings.

In some forms of the present disclosure, in the curing of the portions of the UV curable resin composition, portions of the UV curable resin composition exposed through the openings in the mask sheet may be cured.

In some forms of the present disclosure, in the removing of the remaining portions of the UV curable resin composition, the remaining portions of the UV curable resin composition which are not cured may be removed by one of a wet etching method configured to remove the remaining portions of the UV curable resin composition using a solution and a dry etching method configured to remove the remaining portions of the UV curable resin composition using gas.

In some forms of the present disclosure, the wet etching method may be configured to remove the remaining portions of the UV curable resin composition which are not cured by supplying the solution, selected from the group consisting of deionized water, ethanol, isopropyl alcohol, acetone and combinations thereof, at a pressure of 0.5 to 3 bar.

In some forms of the present disclosure, in the performing the primary bonding and in the performing of the secondary bonding, the subgaskets and the separators may be placed such that the pattern layer is interposed between the separators and the subgaskets.

In some forms of the present disclosure, the forming of the pattern layer may include preparing the base substrate, applying a UV degradable resin composition to the base substrate and curing the UV degradable resin composition, locating a mask sheet including openings on the cured UV degradable resin composition, liquefying portions of the UV degradable resin composition by radiating UV light to the mask sheet, and removing the liquefied portions of the UV degradable resin composition, and the UV degradable resin composition may include a phenol formaldehyde resin.

In some forms of the present disclosure, the forming of the pattern layer may include preparing the subgaskets, locating a mask sheet including openings on each of the subgaskets, liquefying portions of each of the subgaskets by radiating UV light to the mask sheet, and removing the liquefied portions of each of the subgaskets, and the subgaskets may include a phenol formaldehyde resin.

Other forms of the disclosure are discussed infra.

The above and other features of the present disclosure are discussed infra.

DRAWINGS

The above and other features of the present disclosure will now be described in detail with reference to certain exemplary forms thereof illustrated in the accompanying drawings which are given hereinbelow by way of illustration only, and thus are not limitative of the present disclosure, and wherein.

Figure 1:
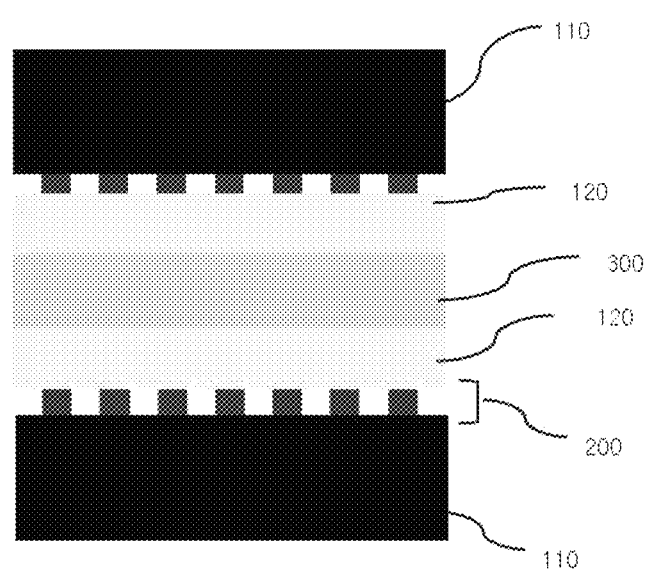
FIG. 1 is a view illustrating the structure of a membrane-electrode assembly in some forms of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various forms of the present disclosure, examples of which are illustrated in the accompanying drawings and described below. While the disclosure will be described in conjunction with exemplary forms, it will be understood that the present description is not intended to limit the disclosure to the exemplary forms. On the contrary, the disclosure is intended to cover not only the exemplary forms, but also various alternatives, modifications, equivalents and other forms within the spirit and scope of the disclosure as defined by the appended claims.

In the following description of the forms, the same elements are denoted by the same reference numerals even when they are depicted in different drawings. In the drawings, the dimensions of structures may be exaggerated compared to the actual dimensions thereof, for clarity of description. In the following description of the forms, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the disclosure. Singular expressions may encompass plural expressions, unless they have clearly different contextual meanings.

In the following description of the forms, terms, such as "including" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the forms, it will be understood that, when the range of a variable is stated, the variable includes all values within the stated range including stated end points of the range. For example, it will be understood that a range of "5 to 10" includes not only values of 5, 6, 7, 8, 9 and 10 but also arbitrary subranges, such as a subrange of 6 to 10, a subrange of 7 to 10, a subrange of 6 to 9, a subrange of 7 to 9, etc., and includes arbitrary values between integers which are valid within the scope of the stated range, such as 5.5, 6.5, 7.5, 5.5 to 8.5, 6.5 to 9, etc. Further, for example, it will be understood that a range of "10% to 30%" includes not only all integers including values of 10%, 11%, 12%, 13%, . . . 30% but also arbitrary subranges, such as a subrange of 10% to 15%, a subrange of 12% to 18%, a subrange of 20% to 30%, etc., and includes arbitrary values between integers which are valid within the scope of the stated range, such as 10.5%, 15.5%, 25.5%, etc.

The present disclosure relates to a membrane-electrode assembly and a method for manufacturing the same, and more particularly, a membrane-electrode assembly including a pattern layer formed between a separator 110 and a subgasket 120 through a UV curing process.

Hereinafter, the structure of the membrane-electrode assembly in some forms of the present disclosure will be described with reference to FIG. 1, and a method for manufacturing the membrane-electrode assembly will be described with reference to FIGS. 2 to 4.

Membrane-Electrode Assembly

The membrane-electrode assembly in some forms of the present disclosure includes an electrolyte membrane 300 including catalyst layers formed on both surfaces thereof, subgaskets 120 provided on the surfaces of the electrolyte membrane 300 having the catalyst layers formed thereon, and separators 110 located on the subgaskets 120, and further includes pattern layers 200 interposed between the subgaskets 120 and the separators 110.

Hereinafter, the structure of the membrane-electrode assembly shown in FIG. 1 will be exemplarily described in detail.

Electrolyte Membrane

The electrolyte membrane 300 in some forms of the present disclosure includes the catalyst layers formed on both surfaces thereof.

In some forms of the present disclosure, the electrolyte membrane 300 is not limited to a specific material, and may employ any material which is generally used in the field of fuel cell technology and may exchange protons.

The catalyst layers may include a catalyst including metal and a catalyst support configured to support the catalyst, and may further include an ionomer.

In some forms of the present disclosure, the catalyst, the ionomer and the catalyst support are not limited to specific materials, and may employ any materials which are generally used in the field of fuel cell technology.

Subgasket

The subgaskets 120 in some forms of the present disclosure are bonded to both surfaces of the electrolyte membrane 300 having the catalyst layers formed thereon, and thus serve to fix and protect the electrolyte membrane 300.

An opening is formed in a region of each of the subgaskets 120 so as to expose the catalyst layers formed on the surfaces of the electrolyte membrane 300 when the subgaskets 120 are bonded to the electrolyte membrane 300, and manifolds are formed at both edges of each of the subgaskets 120.

The subgaskets 120 include one of polyethylene terephthalate (PET), polyethylene naphthalate (PEN), polycyclohexylene dimethylene terephthalate (PCT), and polyimide (PI).

Separator

The separators 110 in some forms of the present disclosure are located on the subgaskets 120 bonded to both surfaces of the electrolyte membrane 300, and are bonded to the subgaskets 120.

The separators 110 serve to supply hydrogen gas and oxygen gas from the outside to the inside of the membrane-electrode assembly, or to discharge water, which is a reaction product, to the outside.

The separators 110 may be formed of graphite, a carbon composite, a metal or an alloy, and, in addition, may be formed of any material which is generally used in the field of fuel cell technology, and has high electrical conductivity, high thermal conductivity and high corrosion resistance.

Pattern Layer

Referring to FIG. 1, the pattern layer 200 in some forms of the present disclosure is interposed between the subgasket 120 and the separator 110.

The pattern layer 200 is formed on a base substrate 100 including one of the subgasket 120 and the separator 110, and is interposed between the subgasket 120 and the separator 110 by adjusting the direction of the base substrate 100 during a process for bonding the subgasket 120 and the separator 110. More preferably, the pattern layer 200 is formed on the base substrate 100 including the subgasket 120.

The pattern layer 200 in some forms of the present disclosure may be formed in two types according to the manufacturing method thereof.

Figure 2A:
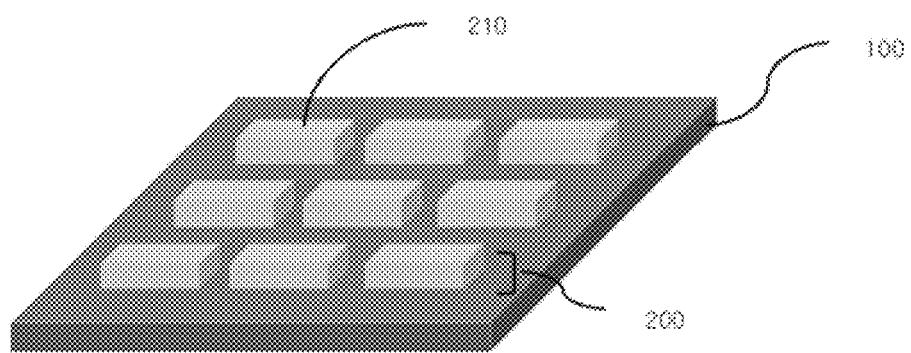
FIGS. 2A and 2B are views separately illustrating pattern layers in some forms of the present disclosure.
Figure 2B:
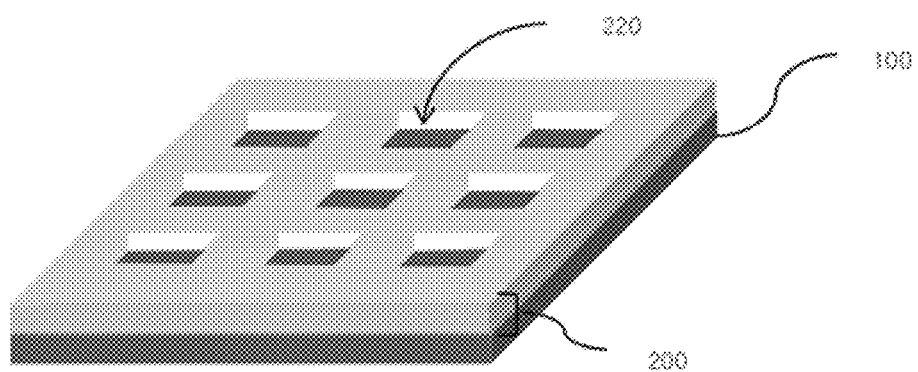

Referring to FIGS. 2A and 2B, the pattern layer 200 may be manufactured in the form of a plurality of protrusions on the base substrate 100 (in FIG. 2A), or be manufactured in the form of a plurality of openings formed in a designated pattern in the base substrate 100 (FIG. 2B). These forms are classified depending on the reaction of a material to form the pattern layer 200 to UV light, and will be described in more detail later in the following description of the method for manufacturing the membrane-electrode assembly.

That is, the pattern layer 200 in some forms of the present disclosure may include pattern members 210 protruding from the base substrate 100 (in FIG. 2A) or may be a film including a plurality of pattern openings 220 (in FIG. 2B). The latter exhibits excellent airtightness due to maximization of the effects of line pressure (in FIG. 2B) and is thus more preferable.

The pattern members 210 included in the pattern layer 200 may have the shape of one of a polygon and a circle. More particularly, the pattern members 210 have the shape of one of a prism and a cylinder. Further, the pattern layer 200 may include the pattern openings 220 having the shape of one of a polygon and a circle.

The pattern layer 200 may include a curable material and a degradable material.

The curable material includes urethane acrylate, and may particularly include aliphatic urethane acrylate.

The curable material may have a viscosity of 600 to 30,000 mPa·s at a temperature of 25° C.

The degradable material may include a phenol formaldehyde resin.

The pattern layer 200 further includes a base material which is one of low-density polyethylene (LDPE), linear low-density polyethylene (LLDPE), thermoplastic polyurethane (TPU), cast polypropylene (CPP), and polyvinylidene fluoride (PVDF). Here, 1,800 parts by weight to 3,300 parts by weight of the base material may be included based on 100 parts by weight of the curable material or the degradable material.

The thickness of the pattern layer 200 may be 500 nm to 50 μm.

Method for Manufacturing Membrane-Electrode Assembly

The method for manufacturing the membrane-electrode assembly in some forms of the present disclosure includes forming the pattern layer 200 on each of the base substrates 100, which is one of the subgaskets 120 and the separators 110 (S1), performing primary bonding such that the subgaskets 120 are bonded to both surfaces of the electrolyte membrane 300 (S2), and performing secondary bonding such that the separators 110 are stacked on the subgaskets (S3).

Hereinafter, these respective operations will be described with reference to FIGS. 2 to 7.

Formation of Pattern Layer (S1)

The formation of the pattern layer 200 in some forms of the present disclosure may be classified into two methods depending on the material of the pattern layer 200. Hereinafter, the two methods will be separately described depending on the corresponding materials.

(Application of Curable Material)

The pattern layer 200 is formed on the base substrate 100, which is one of the subgasket 120 and the separator 110.

The formation of the pattern layer 200 (S1) may include preparing the base substrate 100 (S1-1), applying (S1-2), preparing a mask sheet 40 (S1-3), curing (S1-4), and removing (S1-5).

Particularly, the present disclosure is characterized in that a series of these processes, i.e., preparing the base substrate 100 (S1-1), applying (S1-2), preparing a mask sheet 40 (S1-3), curing (S1-4), and removing (S1-5), is executed in a roll-to-roll manner.

Figure 3:
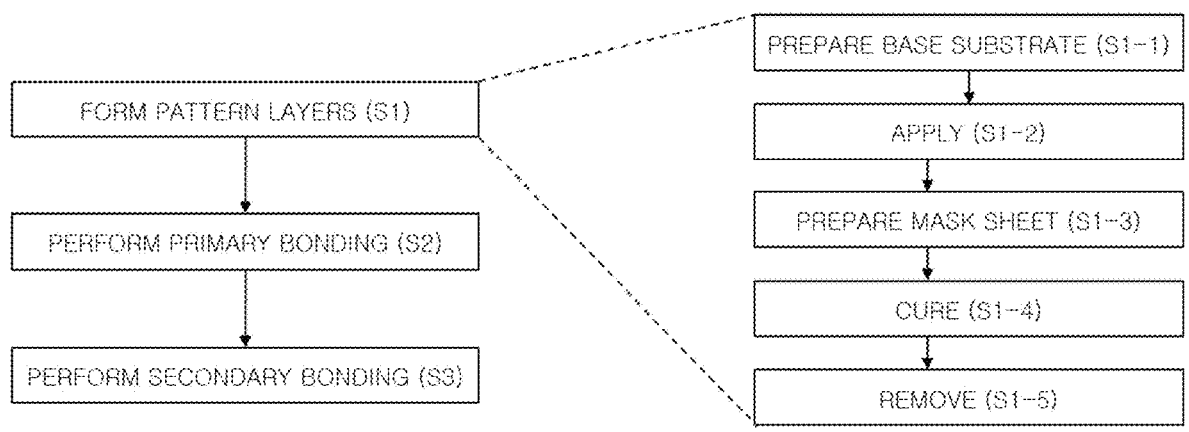
FIG. 3 is a flowchart illustrating a method for manufacturing the membrane-electrode assembly in some forms of the present disclosure, including formation of a pattern layer using a curing material.
Figure 4:
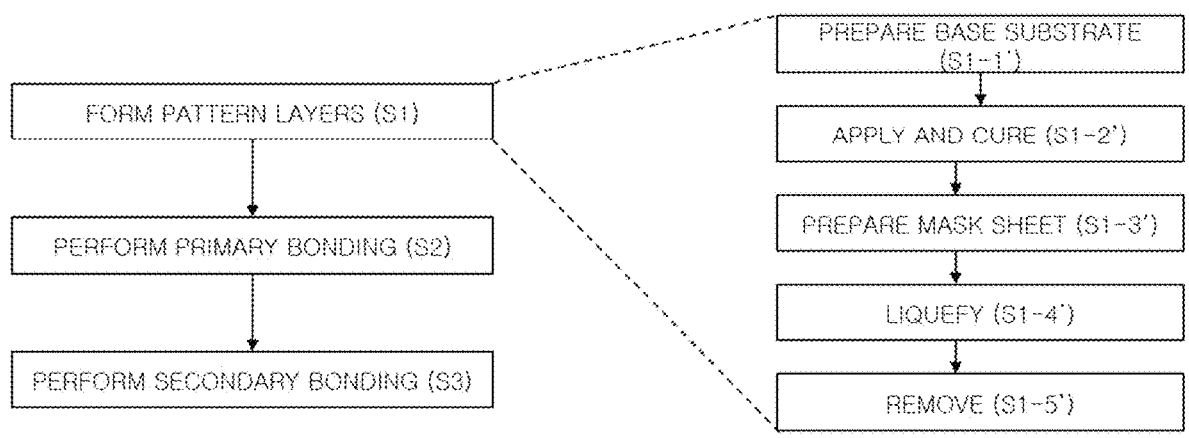
FIG. 4 is a flowchart illustrating another method for manufacturing the membrane-electrode assembly in some forms of the present disclosure, including formation of a pattern layer using a degradable material.
Figure 5:
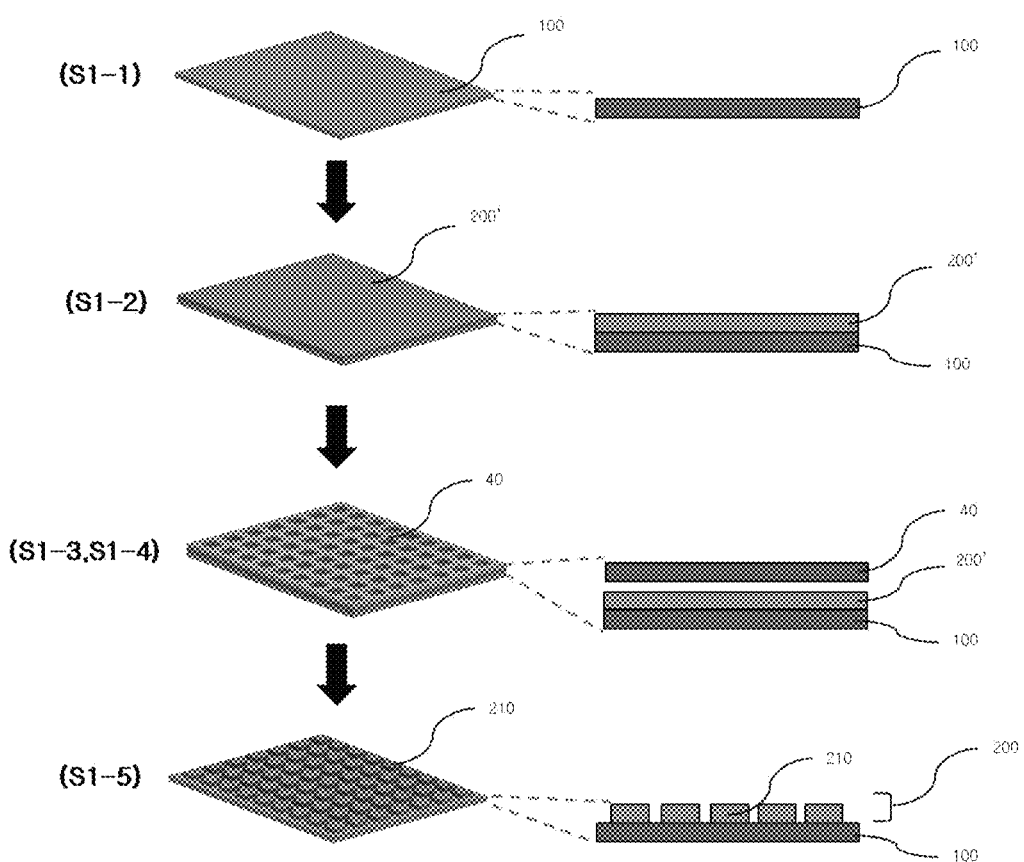
FIG. 5 is a view illustrating a process for manufacturing the membrane-electrode assembly in some forms of the present disclosure.

Referring to FIGS. 3 to 5, the respective operations of the formation of the pattern layer 200 (S1) will be described.

Preparation of Base Substrate (S1-1)

The base substrate 100 in some forms of the present disclosure is continuously fed in the roll-to-roll manner, and the base substrate 100 may be one of the subgasket 120 and the separator 110. The base substrate 100 provides a place to which a UV curable resin composition 200' for forming the pattern layer 200 may be applied.

Figure 6:
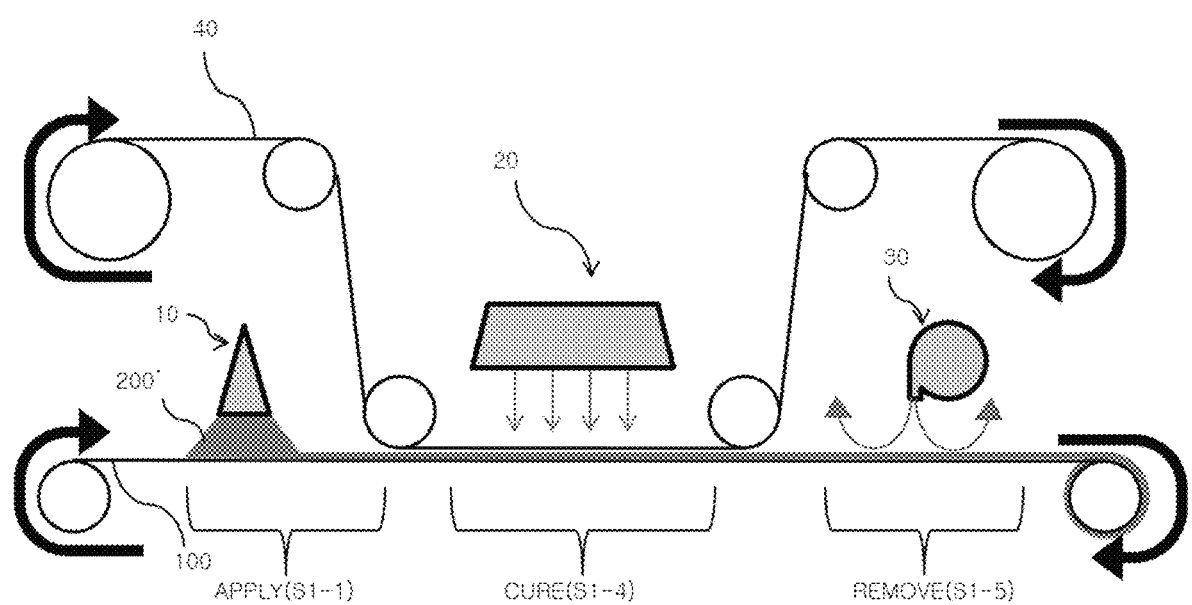
FIG. 6 is a view illustrating a process for manufacturing the membrane-electrode assembly in some forms of the present disclosure in a roll-to-roll manner.

Referring to FIG. 6, it may be confirmed that the UV curable resin composition 200' is applied to the supplied base substrate 100. The pattern layer 200 is ultimately formed from the applied UV curable resin composition 200' and, referring to FIG. 7, it may be confirmed that the pattern layer 200 including the pattern members 210 is formed on the separator 110 or the subgasket 120 so as to be interposed between the separator 110 and the subgasket 120.

The base substrate 100 may be arbitrarily selected from the subgasket 120 and the separator 110 depending on processes, costs and purposes.

Application (S1-2)

The UV curable resin composition 200' is applied to one surface of the prepared base substrate 100. Referring to FIG. 6, it may be confirmed that the UV curable resin composition 200' is applied to the upper surface of the prepared base substrate 100 by an application apparatus 10.

The UV curable resin composition 200' may include a curable material which is cured by UV light, and the content of the curable material may vary greatly depending on whether or not there is a base material.

The UV curable resin composition 200' may include a curable material including urethane acrylate and an initiator. Here, UV curable resin composition 200' may include 95 to 99.9% by weight of the curable material and 0.1 to 5% by weight of the initiator.

The curable material may particularly include aliphatic urethane acrylate, which may be manufactured by reacting a dihydroxy compound, such as polyester, polyether or glycol, with a diisocyanate compound, such as toluene diisocyanate, 1,4-diphenylmethane diisocyanate, isophorone diisocyanate, or hexamethylene diisocyanate.

The initiator may be a photoinitiator which is generally used in the field of UV curing technology, but is not limited to a specific material in the present disclosure.

The UV curable resin composition 200' may further include a base material including one of low-density polyethylene (LDPE), linear low-density polyethylene (LLDPE), thermoplastic polyurethane (TPU), cast polypropylene (CPP), and polyvinylidene fluoride (PVDF).

If the UV curable resin composition 200' includes the base material, the UV curable resin composition 200' may include 1 to 5% by weight of the curable material, 0.1 to 3% by weight of the initiator, and 90 to 96.9% by weight of the base material.

Preparation of Mask Sheet (S1-3)

The mask sheet 40 including openings is prepared on the base substrate 100 to which the UV curable resin composition 200' is applied.

The mask sheet 40 is also continuously fed in the roll-to-roll manner like the base substrate 100, and may particularly be fed at the same feeding speed as the base substrate 100.

Referring to FIG. 6, it may be confirmed that the fed mask sheet 40 is placed on the base substrate 100 to which the UV curable resin composition 200' is applied.

The mask sheet 40 is used to selectively block UV light when the UV curable resin composition 200' is subsequently exposed to UV light.

The mask sheet 40 includes two or more openings, and the openings have the shape of one of a polygon and a circle.

The mask sheet 40 may be in contact with the UV curable resin composition 200' applied to the base substrate 100 but, in order to realize convenience in the process, prevent damage and contamination and increase processing speed, the mask sheet 40 may be located to be spaced apart from the surface of the UV curable resin composition 200' applied to the base substrate 100 by a designated distance.

Curing (S1-4)

Portions of the UV curable resin composition 200' are cured by radiating UV light to the prepared mask sheet 40 by a UV radiation apparatus 20.

The UV curable resin composition 200' is selectively irradiated with UV light through the openings in the mask sheet 40, and then, only the portions of the UV curable resin composition 200' exposed through the openings are cured.

Referring to FIG. 6, the curing of the UV curable resin composition 200' is continuously performed because the mask sheet 40 and the base substrate 100 are moved in parallel, and the UV curable resin composition 200' is selectively cured on the moving base substrate 100.

Removal (S1-5)

The remaining portions of the UV curable resin composition 200', which are not cured, are removed by a removal apparatus 30.

The portions of the UV curable resin composition 200', which are not exposed directly to UV light because the openings in the mask sheet 40 are not located thereon, are not cured and thus remains in a liquid state, and may be removed due to external physical impact. In contrast, the portions of the UV curable resin composition 200', on which the openings in the mask sheet 40 are located, are cured, and thus, the polygonal or circular pattern members 210 are formed.

The uncured portions of the UV curable resin composition 200' may be removed by wet etching or dry etching.

When wet etching is used, the uncured portions of the UV curable resin composition 200' are removed by supplying a solution thereto at a designated pressure and, when dry etching is used, the uncured portions of the UV curable resin composition 200' are removed by supplying gas thereto at a designated pressure. The gas used in dry etching may be any unreactive gas, and is not limited to a specific kind of gas in some forms of the present disclosure.

In wet etching, the uncured portions of the UV curable resin composition 200' are removed by supplying one solution, selected from the group consisting of deionized water, ethanol, isopropyl alcohol, acetone and combinations thereof, at a pressure of 0.5 to 3 bar.

All of the solution supplied in wet etching may be subsequently removed by drying.

Particularly, in some forms of the present disclosure, the application (S1-2), the preparation of the mask sheet 40 (S1-3), the curing (S1-4), and the removal (S1-5) are continuously performed without interruption, and thus, process efficiency may be increased.

(Application of Degradable Material)

The pattern layer 200 is formed on the base substrate 100 corresponding to one of the subgasket 120 and the separator 110.

The formation of the pattern layer 200 (S1) may include preparing the base substrate 100 (S1-1'), applying and curing (S1-2'), preparing a mask sheet 40 (S1-3'), liquefying (S1-4'), and removing (S1-5').

Referring to FIG. 4, the respective operations of the formation of the pattern layer 200 (S1) will be described (a view illustrating the process for manufacturing the membrane-electrode assembly by applying the degradable material being omitted).

Preparation of Base Substrate (S1-1')

The base substrate 100 in some forms of the present disclosure may be one of the subgasket 120 and the separator 110. The base substrate 100 provides a place to which a UV degradable resin composition for forming the pattern layer 200 may be applied.

The base substrate 100 may be arbitrarily selected from the subgasket 120 and the separator 110 depending on processes, costs and purposes.

Application and Curing (S1-2')

The UV degradable resin composition is applied to one surface of the prepared base substrate 100, and is dried.

The UV degradable resin composition may include a degradable material which is degraded (becomes liquid or liquefied) by UV light, and the content of the degradable material may vary depending on whether or not there is a base material.

The UV degradable resin composition may include a degradable material including a phenol formaldehyde resin.

The UV degradable resin composition may further include a base material including one of low-density polyethylene (LDPE), linear low-density polyethylene (LLDPE), thermoplastic polyurethane (TPU), cast polypropylene (CPP), and polyvinylidene fluoride (PVDF).

If the UV degradable resin composition includes the base material, the UV degradable resin composition may include 1 to 5% by weight of the degradable material and 90 to 96.9% by weight of the base material.

In some forms of the present disclosure, drying of the UV degradable resin composition is not limited to a specific method, and may be performed such that the applied UV degradable resin composition is sufficiently cured on the base substrate 100.

Preparation of Mask Sheet (S1-3')

The mask sheet 40 including openings therein is prepared on the base substrate 100 on which the applied UV degradable resin composition is cured.

The mask sheet 40 is used to selectively block UV light when the cured UV degradable resin composition is subsequently exposed to UV light.

The mask sheet 40 may be formed of any material which does not transmit UV light, and is not limited to a specific material in some forms of the present disclosure.

The mask sheet 40 includes two or more openings, and the openings have the shape of one of a polygon and a circle.

The mask sheet 40 may be in contact with the UV degradable resin composition applied to the base substrate 100 but, in order to realize convenience in the process and increase processing speed, the mask sheet 40 may be located to be spaced apart from the surface of the UV degradable resin composition applied to the base substrate 100 by a designated distance.

Liquefaction (S1-4')

Portions of the UV degradable resin composition are liquefied by radiating UV light to the prepared mask sheet 40.

The cured UV degradable resin composition is selectively irradiated with UV light through the openings in the mask sheet 40, and then, only the portions of the UV degradable resin composition exposed through the openings are liquefied.

Removal (S1-5')

The liquefied portions of the cured UV degradable resin composition are removed.

The portions of the UV degradable resin composition, which are not exposed directly to UV light because the openings in the mask sheet 40 are not located thereon, remains in the cured state. In contrast, the portions of the UV degradable resin composition, on which the openings in the mask sheet 40 are located, are converted into a liquid state and may be removed due to external physical impact.

The liquefied portions of the UV resin composition are melted in the shapes of the openings in the mask sheet 40. That is, the pattern layer 200 in some forms of the present disclosure, from which the molten portions of the UV degradable resin composition are removed, has a shape similar to the shape of the mask sheet 40.

The pattern openings 220 having a polygonal or circular shape are formed by removing the molten portions of the UV degradable resin composition.

The liquefied portions of the cured UV degradable resin composition may be removed by wet etching or dry etching.

When wet etching is used, the liquefied portions of the cured UV degradable resin composition are removed by supplying a solution thereto at a designated pressure and, when dry etching is used, the liquefied portions of the cured UV degradable resin composition are removed by supplying gas thereto at a designated pressure.

In wet etching, the liquefied portions of the cured UV degradable resin composition are removed by supplying one solution, selected from the group consisting of deionized water, ethanol, isopropyl alcohol, acetone and combinations thereof, at a pressure of 0.5 to 3 bar.

All of the solution supplied in wet etching may be subsequently removed by drying.

(Pattern Subgasket)

The material of the subgasket 120 used in the membrane-electrode assembly in some forms of the present disclosure may include a phenol formaldehyde resin. Here, the subgasket 120 may include a degradable material as a whole, and a patterned subgasket may be acquired by liquefying a designated thickness from the surface of the subgasket 120 by adjusting a UV light radiation time. That is, a pattern may be formed in the subgasket 120 itself without formation of a separate pattern layer 200.

A method for manufacturing the patterned subgasket in some forms of the present disclosure includes preparing the subgasket 120, placing the mask sheet 40 including the openings on the subgasket 120, liquefying portions of the subgasket 120 by radiating UV light to the mask sheet 40, and removing the liquefied portions of the subgasket 120.

The method for manufacturing the patterned subgasket is the same as the above-described formation of the pattern layer 200 using the degradable material except that the subgasket 120 is prepared as the base substrate 100 and the application and curing of the UV degradable resin composite are omitted. However, the thickness of the liquefied portions of the subgasket 120 should be 10% to 50% of the total thickness of the subgasket 120.

Primary Bonding (S2)

Figure 7:
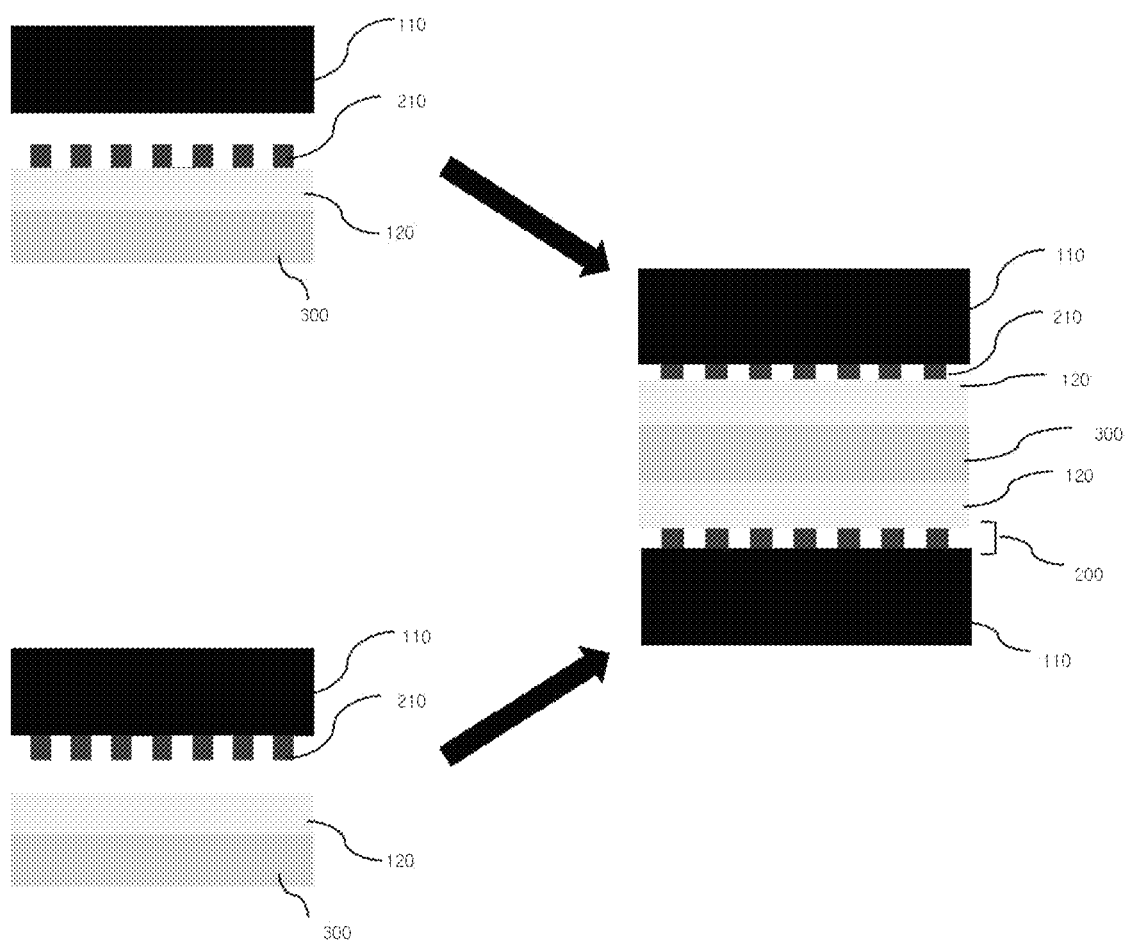
FIG. 7 is a view exemplarily illustrating bonding in the membrane-electrode assembly in some forms of the present disclosure.

In order to fix the electrolyte membrane 300 having the catalyst layers formed on both surfaces thereof, the subgaskets 120 are bonded to both surfaces of the electrolyte membrane 300. Referring to FIG. 7, it may be confirmed that, if the subgaskets 120 are used as the base substrates 100 in some forms of the present disclosure, the subgaskets 120 are bonded to the electrolyte membrane 300 such that the other surfaces of the subgaskets 120 opposite to the surfaces thereof having the pattern layers 200 formed thereon are placed on both surfaces of the electrolyte membrane 300.

Secondary Bonding (S3)

The separators 110 are bonded to the subgaskets 120 bonded to both surfaces of the electrolyte membrane 300. Referring to FIG. 7, it may be confirmed that, if the separators 110 are used as the base substrates 100 in some forms of the present disclosure, when the separators 110 and the subgaskets 120 are bonded, the separators 110 are placed such that the pattern layers 200 come into contact with the subgaskets 120 so as to be interposed between the subgaskets 120 and the separators 110.

Hereinafter, the present disclosure will be described in more detail with reference to detailed examples. However, the following examples merely illustrate forms of the present disclosure, and are not intended to limit the scope of the present disclosure.

Example 1

A UV curable resin composite including 49.5% by weight of an epoxy-based curable material (SU-8, produced by Sigma-Aldrich Corp.), 0.5% by weight of a photoinitiator (Irgacure), and 50% by weight of a base material including polyurethane was applied to a PET film to a thickness of 30 μm. Hereinafter, after the PET film having the UV curable resin composite applied thereto was dried at a temperature of 80° C. for 30 minutes, a mask sheet (formed of a UV-blocking material) having a plurality of openings regularly arranged in a grid pattern was placed on the PET film having the UV curable resin composite applied thereto, and UV light of a wavelength of 356 nm was radiated to the mask sheet for 5 minutes. Thereafter, the mask sheet was removed, and a pattern layer was formed by supplying ethanol to the UV curable resin composition on the PET film at a pressure of 2 bar. (Here, the respective processes were performed in a darkroom before curing the UV curable resin composition).

Figure 8:
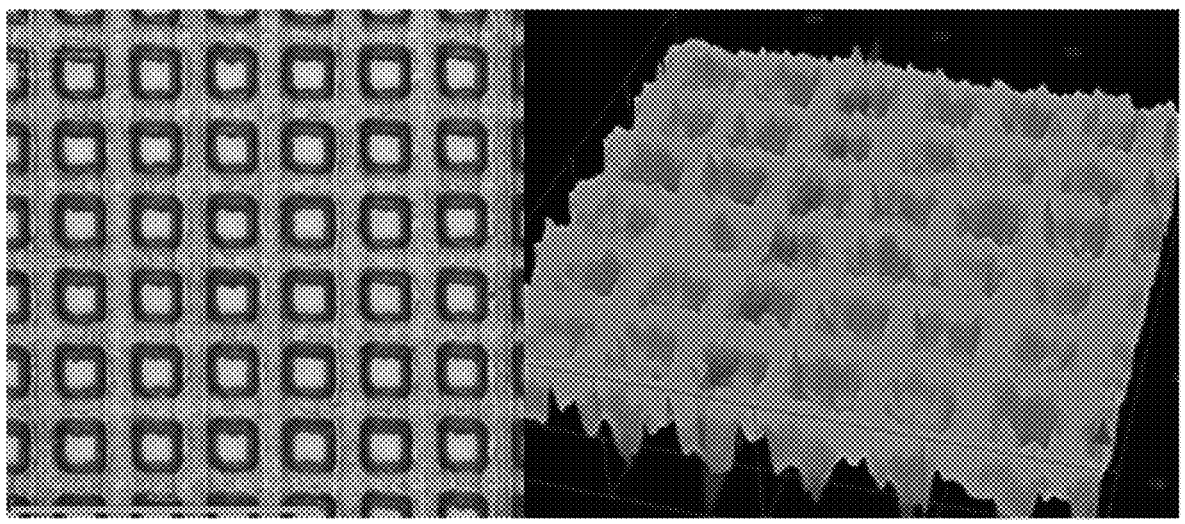
FIG. 8 is an image showing a subgasket having a pattern layer formed thereon, manufactured according to Example 1.

FIG. 8 is an image showing the shape of the pattern on the PET film.

Test Example 1

Figure 9:
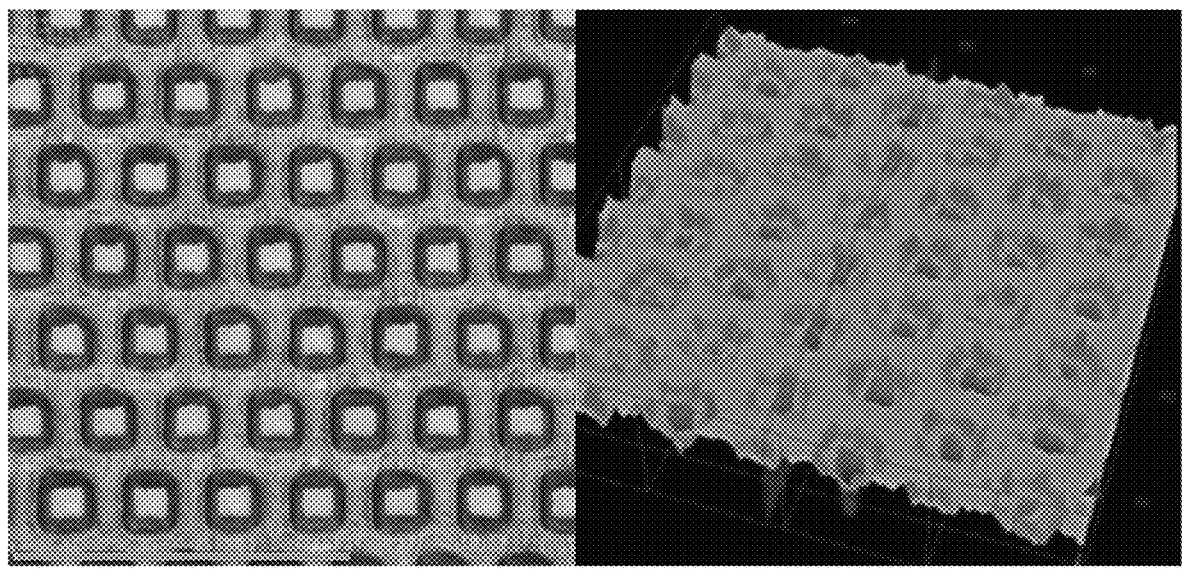
FIG. 9 is an image showing the result of Test Example 1 under one set of conditions.
Figure 10:
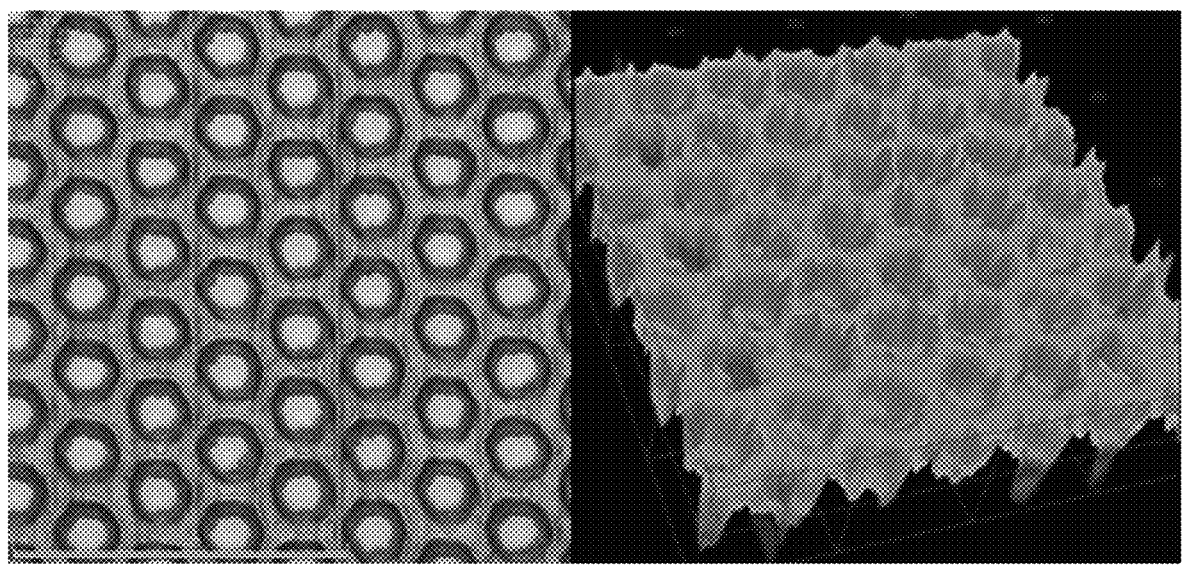
FIG. 10 is an image showing the result of Test Example 1 under another set of conditions.

Pattern layers manufactured in Example 1 were respectively stored in extreme environments, i.e., at a relative humidity of 100% and a temperature of 100° C. for 1 day and 30 days, and then the surface forms thereof were observed and shown in FIG. 9 (stored for 1 day) and FIG. 10 (stored for 30 days).

Referring to FIGS. 9 and 10, it may be confirmed that the form of the pattern layer was well maintained under the extreme environments (i.e., at a high temperature and a high humidity).

As is apparent from the above description, the present disclosure provides a method for implementing a pattern shape on a contact surface between a separator and a subgasket so as to ensure airtightness.

Further, the present disclosure provides a pattern-shaped film which may have high ductility and high reaction force to compression and be inserted between a separator and a subgasket.

Moreover, the present disclosure provides a method for using a material which is conventionally difficult to insert into a membrane-electrode assembly and to form a pattern thereon.

In addition, the present disclosure provides a method for inserting a soft film having a pattern formed thereon between a subgasket and a separator at a high processing speed.

Further, the present disclosure provides a method for forming a pattern on a soft film applied to a membrane-electrode assembly without contraction.

In addition, the present disclosure provides a soft film having a pattern formed thereon, which is applicable to extreme environments.

The present disclosure has been described in detail with reference to preferred forms thereof. However, it will be appreciated by those skilled in the art that changes may be made in these forms without departing from the principles and spirit of the disclosure, the scope of which is defined in the appended claims and their equivalents.

What is claimed is:

1. A membrane-electrode assembly comprising:
    an electrolyte membrane comprising catalyst layers formed on both surfaces of the electrolyte membrane;
    subgaskets provided on surfaces of the electrolyte membrane;
    separators provided on the subgaskets; and
    pattern layers interposed between the subgaskets and the separators.

2. The membrane-electrode assembly of claim 1, wherein the pattern layers further comprising at least one pattern member, and wherein the pattern member have a shape of one of a polygon or a circle.

3. The membrane-electrode assembly of claim 2, wherein the pattern layers further comprise:
    a curable material including urethane acrylate.

4. The membrane-electrode assembly of claim 3, wherein the pattern layers further comprise:
    a base material including at least one of low-density polyethylene (LDPE), linear low-density polyethylene (LLDPE), thermoplastic polyurethane (TPU), cast polypropylene (CPP), or polyvinylidene fluoride (PVDF).

5. The membrane-electrode assembly of claim 4, wherein the pattern layers comprise:
    1,800 parts by weight to 3,300 parts by weight of the base material based on 100 parts by weight of the curable material.

6. The membrane-electrode assembly of claim 1, wherein the pattern layers comprise:
    pattern openings having a shape including one of a polygon or a circle.

7. The membrane-electrode assembly of claim 6, wherein the pattern layers comprise:
    a degradable material including a phenol formaldehyde resin.

8. The membrane-electrode assembly of claim 1, wherein the pattern layers have a thickness of 500 nm to 50 μm.

* * * * *